United States Patent Office 3,553,289
Patented Jan. 5, 1971

3,553,289
POLYOXAMIDES FROM 3-AMINOMETHYL-3,5,5-TRIMETHYL CYCLOHEXYLAMINE
Frederick Keith Duxbury, Mountfield, and Arthur Brian, Joseph Oldham, and Wendy Rawstron Smith, Manchester, England, assignors to Imperial Chemical Industries Limited, London, England, a corporation of Great Britain
No Drawing. Filed May 6, 1968, Ser. No. 727,071
Claims priority, application Great Britain, May 10, 1967, 21,669/67
Int. Cl. C08g 41/04
U.S. Cl. 260—857                          4 Claims

ABSTRACT OF THE DISCLOSURE

Polyoxamides and copolyoxamides of oxalic acid and 3-aminomethyl-3,5,5-trimethyl cyclohexylamine, optionally with other diamines. Preparation of such polyoxamides and copolyoxamides from oxalic esters and diamines. Fibre-forming blends of such polyoxamides with polyamides such as poly-(hexamethylene adipamide).

---

This invention relates to polyamides, copolyamides and polymer blends thereof.

Linear fibre-forming polyamides of the class known as polyoxamides are already known, thus polyoxamides obtained by reacting oxalic acid diesters with hexamethylene diamines have been described in the prior art.

We have now discovered new polyoxamides which may be fabricated into fibres or mouldings. These new polyoxamides have properties different from those of prior art polyamides, in particular they have a transparent glass clear appearance which is unaffected by moderate temperature changes. The amine component in these new polyoxamides is 3-aminomethyl-3,5,5-trimethyl cyclohexylamine and the polyoxamides are made by reaction of this amine with a diester of oxalic acid.

Thus according to the present invention there are provided polyoxamides of oxalic acid and 3-aminomethyl-3,5,5-trimethyl cyclohexylamine.

Polyoxamides of the present invention have recurring structural units of the formula,

—NH—R—NH—CO—CO— where R represents the radical

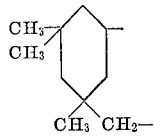

The amine, 3-aminomethyl-3,5,5-trimethyl cyclohexylamine used in making the polyoxamides of the present invention may be made from isophorone by reaction with hydrogen cyanide followed by reductive amination.

The polyoxamides of the present invention are made by reaction of esters of oxalic acid with 3-aminomethyl-3,5,5-trimethyl cyclohexylamine. Any diester of oxalic acid may be used although it is preferred to use a low boiling dialkyl ester containing from two to five carbon atoms in the alkyl group, particularly the dibutyl ester on account of the increased thermal stability of butyl oxamate end groups compared to other lower alkyl oxamate end groups in the polyoxamide.

Although the preparation of the present polyoxamides may be carried out by any known process for the manufacture of polyamides of oxalic acid we prefer to use a process wherein the oxalic acid diester and the diamine are first mixed together in the presence of an organic liquid which is either an entraining agent of boiling point higher than the alcohol liberated in the reaction or is capable of forming an azeotrope with the liberated alcohol, the entraining or azeotroping liquid being present in such an amount that by removing such liquid all the liberated alcohol is removed before completion of polymerisation. The polymerisation may then be completed at a temperature of from 200° to 300° C. The polymerisation may be completed under atmospheric or reduced pressure.

Thus the process may be described as a two stage polymerisation, the first stage being the preparation of a prepolymer in the solvent followed by removal of the solvent and the second stage further polymerisation of the prepolymer. If necessary further additions of the original reactants may be added before the second stage in order to obtain chemical equivalence between amine and ester groups.

A process of the type described above is fully described in U.K. Pat. No. 888,150, which also gives examples of organic liquids which may be used.

We have also found that useful copolyoxamides which have fibre forming properties may be made from oxalic esters and 3-aminomethyl-3,5,5-trimethyl cyclohexylamine together with at least one other diamine.

Thus according to a further feature of the present invention there are provided copolyoxamides of oxalic acid and a mixture of diamines comprising 3-aminomethyl-3,5,5-trimethyl cyclohexylamine and at least one aliphatic, alicyclic, mixed aliphatic aromatic or aromatic diamine containing more than 5 carbon atoms and preferably between 5 and 20 carbon atoms.

Examples of additional diamines which may be used in conjunction with 3-aminomethyl-3,5,5-trimethyl cyclohexylamine in the preparation of the above copolyoxamides include pentamethylenediamine, hexamethylenediamine, heptamethylenediamine, octamethylenediamine, nonamethylenediamine, decamethylenediamine, dodecamethylenediamine, 2-methyl and 3-methylhexamethylenediamine, 3-methoxyhexamethylenediamine, 2,3-, 2,4-, 2,5-, and 3,4-dimethylhexamethylenediamines, 2,2,4 and 2,4,4 trimethylhexamethylene diamines, 2,11-diaminododecane, meta-xylylenediamine, para-xylylene diamine, 1,3- and 1,4-bis(aminomethyl)cyclohexanes and 4,4′ diamino dicyclohexylmethane.

The above copolyoxamides may be prepared by the process already described, that is by the reaction of a mixture of the respective amines with an oxalic ester or alternatively separate prepolymers may be prepared, one from 3-aminomethyl-3,5,5-trimethyl cyclohexylamine and one from an additional amine and the final polymerisation carried out with a mixture of these two prepolymers.

One or more than one additional diamine may be used.

Prior art catalysts known for use in the manufacture of polyamides may be used in the manufacture of the polyoxamides or copolyoxamides if desired.

We have further found that melt blends of the polyoxamides and copolyoxamides of this invention with polyamides may be spun to give synthetic fibres of increased tenacity and modulus.

Thus as a further embodiment of the present invention there are provided fibre-forming polymer blends of polyamides with the polyoxyamides and copolyoxamides hereinbefore described.

It is preferred to use polyoxamides and copolyoxamides in the polymer blends in an amount of up to one third of the polymer blend by weight.

In making the polymer blends it is preferred to use a polyamide and a polyoxamide or copolyoxamide which both have melting points within a range of 50° C. preferably 10° C.

Any of the polyoxamides or copolyoxamides hereinbefore described may be used in the preparation of the fibre-forming polymer blends.

Any fibre-forming polyamide may be used in the preparation of the fibre-forming polymer blends.

Examples of fibre-forming polyamides which may be used include poly-(hexamethyleneadipamide), poly-(hexamethylenesuberamide), poly-(hexamethylene sebacamide), poly-(hexamethylenedodecandiamide), poly-caprolactam, poly-undecanolactam and poly-dodecanolactam.

The polymer blends may be made by mixing together the polyamide and polyoxamide or copolyoxamide in the molten state in the desired proportions.

The polymer blends may also be made by preparing the polyamide in the manner well-known in the art and incorporating the appropriate polyoxamide or copolyoxamide, as polymer or prepolymer, into the polyamide polymerisation at an early stage.

The reduced water sensitivity, particularly in respect of physical properties, of polyoxamide/polyamide blends as compared with the polyamide is important in industrial applications such as tyre cords.

The invention is illustrated but not limited by the following examples in which all parts are by weight except where otherwise stated and the relationship of parts by weight to parts by volume is that of the kilogram to the litre.

EXAMPLE 1

Preparation of a polyoxamide of oxalic acid and 3-aminomethyl-3,5,5-trimethyl cyclohexylamine Di-n-butyl oxalate (606 parts) in xylene (300 parts by volume) was added slowly with stirring to the above diamine (510 parts) in xylene (300 parts by volume) and heated at reflux for one hour when the xylene/butanol mixture (B.P. 115-125) and xylene (B.P. 140° C.) were removed slowly by distillation, ultimately heating the residual liquid to 180° C. The resultant oil was cast into trays and maintained at 100° C./15 mm. overnight when a glassy solid (intrinsic viscosity=0.2) was obtained; this material was heated with stirring under nitrogen for one hour at 275° C. affording a polyoxamide of M.P. 262° intrinsic viscosity 0.57 which may be melt fabricated.

EXAMPLE 2

Preparation of a fibre-forming polymer blend of poly-(hexamethylene adipamide) and the polyoxamide of oxalic acid and 3-aminomethyl-3,5,5-trimethyl cyclohexylamine Nylon 66, poly(hexamethylene adipamide) (56 parts), the polyoxamide of Example 1 (14 parts) and water (5 parts by volume) were heated under nitrogen at 275° and stirred for 20 mins. in the molten state. The polymer blend was then cooled rapidly and on melt fabrication gave mouldings and fibres of improved properties compared with nylon 66.

EXAMPLE 3

Preparation of fibre-forming polymer blends of poly (hexamethylene adipamide) and the polyoxamide of oxalic acid and 3-aminomethyl-3,5,5-trimethyl cyclohexylamine (A) A blend similar to that of Example 2 was prepared but the heating time at 275° C. under nitrogen was lengthened to 1 hour.

(B) A further blend was made using poly-(hexamethylene adipamide) (63 parts) and the polyoxamide of Example 1 (7 parts), in this example the time of heating was 20 minutes as in Example 2.

The two blends thus contained 20% and 10% respectively by weight of the polyoxamide of Example 1.

The two blends were spun into fibres which after drawing 5 times over a pin at 140° C. and a plate at 180° C. had the following properties (Table 1) which were compared with controls consisting of nylon 66 made under identical conditions in each case.

TABLE I

| | Tenacity | Extensibility | Initial modulus |
|---|---|---|---|
| Blend A (20% polyoxamide) | 3.5 | 12.8 | 36.2 |
| Nylon 66 control | 4.0 | 26.7 | 32.6 |
| Blend B (10% polyoxamide) | 5.5 | 21.0 | 35.6 |
| Nylon 66 control | 5.1 | 19.8 | 31.0 |

EXAMPLE 4

Preparation of copolyoxamide of oxalic acid with 3-aminomethyl-3,5,5-trimethyl cyclohexylamine and hexamethylene diamine The procedure of Example 1 was repeated using in place of 510 parts of the diamine used therein, 477.4 parts of 3-aminomethyl-3,5,5-trimethyl cyclohexylamine and 32.6 parts of hexamethylene diamine. The product was a copolyoxamide which could be melt fabricated to give mouldings.

What we claim is:

1. A fiber-forming polymer blend comprising a fiber-forming polyamide and from 10% to 33⅓% by weight based on the weight of the polymer blend of a polyoxamine of oxalic acid and 3-aminomethyl-3,5,5-trimethyl cyclohexylamine or a copolyoxamide of oxalic acid, 3-aminomethyl-3,5,5-trimethyl cyclohexylamine and at least one aliphatic, alicyclic, mixed aliphatic aromatic or aromatic diamine containing between 5 and 20 carbon atoms.

2. A fibre-forming polymer blend as claimed in claim 1 wherein the polyamide is hexamethylene adipamide.

3. A fibre-forming polymer blend as claimed in claim 1 wherein the polyamide and polyoxamide or copolyoxamide have melting points within a range of 50° C.

4. A fibre-forming polymer blend as claimed in claim 3 wherein the melting points are within a range of 10° C.

References Cited

UNITED STATES PATENTS

| 3,160,677 | 12/1964 | Duxbury | 260—857 |
| 3,247,168 | 4/1966 | Stamatoff | 260—857 |
| 3,352,831 | 11/1967 | Schmitt | 260—78 |
| 3,352,834 | 11/1967 | Schmitt | 260—78 |
| 3,352,835 | 11/1967 | Schmitt | 260—78 |
| 3,352,836 | 11/1967 | Schmitt | 260—78 |
| 3,352,913 | 11/1967 | Schmitt | 260—78 |
| 3,294,759 | 12/1966 | Gabler | 260—78 |

PAUL LIEBERMAN, Primary Examiner

U.S. Cl. X.R.

260—78